United States Patent
Eom et al.

(10) Patent No.: US 8,841,850 B2
(45) Date of Patent: Sep. 23, 2014

(54) DIMMING ANGLE SENSING CIRCUIT AND DRIVING METHOD THEREOF

(75) Inventors: Hyun-Chul Eom, Seoul (KR); Seunguk Yang, Anyang (KR); Gye-Hyun Cho, Incheon (KR)

(73) Assignee: Fairchild Korea Semiconductor Ltd., Bucheon (KR)

(*) Notice: Subject to any disclaimer, the term of this patent is extended or adjusted under 35 U.S.C. 154(b) by 313 days.

(21) Appl. No.: 13/479,780

(22) Filed: May 24, 2012

(65) Prior Publication Data

US 2012/0299493 A1 Nov. 29, 2012

Related U.S. Application Data

(60) Provisional application No. 61/489,848, filed on May 25, 2011.

(30) Foreign Application Priority Data

Apr. 26, 2012 (KR) .................. 10-2012-0044068

(51) Int. Cl.
  *H05B 37/00* (2006.01)
(52) U.S. Cl.
  CPC ..................... *H05B 37/00* (2013.01)
  USPC ..................... 315/200 R; 315/291

(58) Field of Classification Search
  None
  See application file for complete search history.

(56) References Cited

U.S. PATENT DOCUMENTS

| 6,486,616 B1* | 11/2002 | Liu et al. ..................... 315/291 |
| 7,339,331 B2* | 3/2008 | Vanderzon ..................... 315/291 |
| 8,405,319 B2* | 3/2013 | Sadwick et al. ............... 315/291 |
| 2011/0095700 A1* | 4/2011 | Kanamori et al. ............ 315/291 |
| 2011/0115399 A1* | 5/2011 | Sadwick et al. .............. 315/287 |

OTHER PUBLICATIONS iW3610 ACDC Digital Power Controller for Dimmable LED Advance Datasheet, Rev 0.5 pp. 1-21, iWatt Inc. Confidential.

* cited by examiner

*Primary Examiner* — Crystal L Hammond
(74) *Attorney, Agent, or Firm* — Okamoto & Benedicto LLP (57) ABSTRACT

The present invention relates to a dimming angle sensing circuit and a driving method thereof.
A dimming angle sensing circuit according to an exemplary embodiment of the present invention uses a zener diode. The dimming angle sensing circuit generates a comparison voltage according to a comparison result of a line voltage and a zener voltage. The line voltage is generated from rectification of an AC input passed through a dimmer. The dimming angle sensing circuit generates a sense voltage corresponding to a dimming angle of the dimmer by low-pass filtering the comparison voltage.

20 Claims, 6 Drawing Sheets

DIMMING ANGLE SENSING CIRCUIT AND DRIVING METHOD THEREOF

CROSS-REFERENCE TO RELATED APPLICATION

This application claims priority to and the benefit of U.S. Patent Application No. 61/489,848 filed in the USPTO on May 25, 2011, and Korean Patent Application No. 10-2012-0044068 filed in the Korean Intellectual Property Office on Apr. 26, 2012, the entire contents of which are incorporated herein by reference.

BACKGROUND OF THE INVENTION (a) Field of the Invention

The present invention relates to a dimming angle sensing circuit and a driving method thereof.

(b) Description of the Related Art

A triac dimmer passes each cycle of a sine wave of an AC input by a dimming angle. In order to maintain the train dimmer in a turn-on state, more than a predetermined holding current should flow through the dimmer.

In further detail, when a dimmer is controlled to control brightness of lighting, an output current supplied to the lighting should be controlled according to a dimming angle. That is, the lighting should be more bright as the dimming angle is increased, and the lighting should be more dark as the dimming angle is decreased.

The power supply needs information on a dimming angle to supply an output current to the lighting according to the dimming angle. Otherwise, the power supply generates a constant output current without regard to the dimming angle, thereby causing an undesired increase of a switching duty of the power supply.

For example, although the dimming angle is controlled to be 90 degrees in order to decrease the brightness of the lighting to the half, the power supply may increase the switching duty to supply the output current as much as when the dimming angle is 180 degrees.

As described, information on a dimming angle is required, and typically, a digital circuit is used to sense and calculate a dimming angle. The digital circuit includes a switch to sense a dimming angle. However, a switching noise may occur during sensing of the dimming angle due to switching operation of the switch.

Further, the resolution of the digital circuit may be increased to accurately sense the dimming angle and thus the size of the digital circuit may be increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a dimming angle sensing circuit that does not cause a size increase of a digital circuit, and a driving method thereof.

A dimming angle sensing circuit according to an exemplary embodiment of the present invention includes: a comparing circuit generating a comparison voltage according to a comparison result of a line voltage and a zener voltage, the line voltage generated by rectifying an AC input passed through a dimmer; and a filtering circuit generating a sense voltage corresponding to a dimming angle of the dimmer by low-pass filtering the comparison voltage.

The comparison circuit receives the line voltage through a first resistor and includes a zener diode being connected when the line voltage is higher than the zener voltage, and the comparison voltage is a voltage of a first node where the first resistor and the zener diode are connected.

The first resistor is connected to the line voltage and a cathode of the zener diode, and an anode of the zener diode is connected to the ground.

The filtering circuit includes a second resistor and a third resistor that divide the comparison voltage and a capacitor connected to a second node where the second resistor and the third resistor are connected, and the sense voltage is a voltage of the second node.

A first end of the second resistor is connected to the comparison voltage, the third resistor is connected between a second end of the second resistor and the ground, and the capacitor is connected to the third resistor in parallel.

A dimming angle sensing circuit another exemplary embodiment of the present invention uses an auxiliary voltage generated in an auxiliary coil of a power supply. The auxiliary coil is coupled with a predetermined turn ratio to a first coil that is connected to a line voltage rectified from an AC passed through a dimmer. The dimming angle sensing circuit includes: a comparing circuit generating a comparison voltage according to a comparison result of a first voltage that depends on the auxiliary voltage with a zener voltage; and a filtering circuit generating a sense voltage that corresponds to a dimming angle of the dimmer by low-pass filtering the comparison voltage.

The auxiliary voltage is generated only while the line voltage is provided. While the line voltage is provided, the auxiliary voltage has a polarity that is opposite to that of the line voltage during a turn-on period of the switch and the auxiliary voltage has a polarity that is the same as that of an output voltage of the power supply during a turn-off period of the switch.

The comparing circuit includes: a diode connected by the auxiliary voltage; a capacitor maintaining a voltage transmitted through the diode as a DC voltage; and a zener diode being connected when the DC voltage maintained by the capacitor is higher than a zener voltage, and the comparison voltage is a cathode voltage of the zener diode.

The comparing circuit further includes a fourth resistor biasing the zener diode by generating a voltage difference between a cathode of the zener diode and the auxiliary voltage, and the first voltage is obtained by subtracting a both-end voltage of the fourth resistor from the auxiliary voltage. The comparing circuit further includes a fifth resistor connected to the capacitor in parallel and forming a discharging path of the capacitor during a period that no line voltage is provided.

The comparing circuit includes: a diode including an anode to which the auxiliary voltage is connected; a fourth resistor having a first end connected to a cathode of the diode; a fifth resistor connected between a second end of the fourth resistor and the ground; a capacitor connected to the fifth resistor in parallel; and a zener diode connected to the capacitor in parallel. The first voltage is a voltage passed through the diode and the fourth resistor.

A dimming angle sensing circuit according to another exemplary embodiment of the present invention includes a zener diode. A driving method of the dimming angle sensing circuit includes: receiving a line voltage generated from rectification of an AC input passed through a dimmer; maintaining a comparison voltage as a zener voltage when the line voltage is higher than the zener diode; and generating a sense voltage corresponding to a dimming angle of the dimmer by low-pass filtering the comparison voltage.

When the line voltage is lower than the zener voltage, the comparison voltage depends on the line voltage.

A driving method of a dimming angle sensing circuit according to another exemplary embodiment of the present invention includes: receiving an auxiliary voltage of an auxiliary coil coupled to a first coil with a predetermined turn ratio, the first coil connected to a line voltage that is rectified from an AC input passed through a dimmer; generating a comparison voltage according to a comparison result of a first voltage corresponding to the auxiliary voltage and a zener voltage; and generating a sense voltage corresponding to a dimming angle of the dimmer by low-pass filtering the comparison voltage.

The auxiliary voltage is generated during the line voltage is provided, and while the line voltage is provided, the method for driving the dimming angle sensing circuit further includes: generating the auxiliary voltage with a polarity that is opposite to a polarity of the line voltage during a turn-on period of a switch connected to the first coil; and generating the auxiliary voltage with a polarity that is the same as that of an output voltage of the power supply during a turn-off period of the switch.

The generating the comparison voltage includes: connecting a diode by the auxiliary voltage; maintaining a voltage transmitted through the diode as a DC voltage by a capacitor; and connecting the zener diode when the DC voltage is higher than the zener voltage, and the comparison voltage is a cathode voltage of the zener diode. The comparison voltage is a cathode voltage of the zener diode.

According to the exemplary embodiments of the present invention, a dimming angle sensing circuit that does not cause a switching noise in angle sensing and does not cause a size increase of a digital circuit, and a driving method thereof can be provided.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

A dimming angle sensing circuit according to the first exemplary embodiment of the present invention is realized as an analog circuit. When the dimming angle sensing circuit is realized as the analog circuit, a dimming angle calculation error may occur according to a line voltage range. To prevent this, a zener diode is used in the present invention. Here, an AC input passed through a dimmer is rectified in a rectification circuit such that the line voltage is generated.

In addition, a dimming angle sensing circuit according to a second exemplary embodiment of the present invention may uses a zener diode, and may use a voltage of an auxiliary coil of a power supply to which a line voltage is input may be used instead of using a line voltage.

When a switch mode power supply (SMPS) is used as the power supply, a voltage generated in the auxiliary coil coupled to a primary coil with a predetermined turn ratio may be used to calculate a dimming angle. The power supply includes a switch connected to the primary coil, and controls energy transmitted from the primary side to a secondary side by controlling switching operation of the switch. A output end voltage of the power supply disposed in the secondary side is an output voltage, and the power supply can sense an output voltage an control the switching operation of the switch for a constant output voltage.

Figure 1:
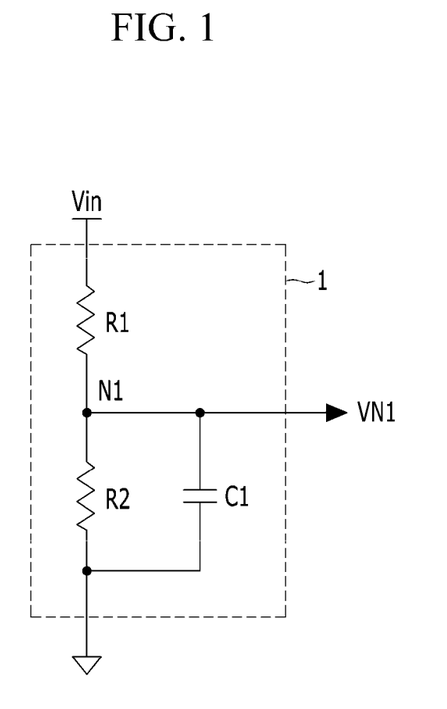
FIG. 1 shows a dimming angle sensing circuit realized as an analog circuit.

FIG. 1 shows a dimming angle sensing circuit realized as an analog circuit. A dimming angle sensing circuit 1 shown in FIG. 1 includes two resistors R1 and R2 and a capacitor C1.

A first end of the resistor R1 is connected to a line voltage Vin, and a second end of the resistor R2 is connected to a first end of the resistor R2 and a first end of the capacitor C1.

A dimming angle can be calculated using a voltage VN1 of a node N1. The dimming angle can be calculated by comparing a predetermined reference voltage and the voltage VN1 and dividing a period during which the voltage VN1 is higher than the reference voltage by a one cycle period of the voltage VN1.

However, the line voltage Vin has a very wire voltage range. For example, since a voltage range of the AC input is 180 Vac to 265 Vac, the voltage range of the line voltage Vin is also 180V to 265V. Then, a level of the voltage VN1 is changed according to voltage variation of the line voltage Vin, and accordingly the voltage VN1 is changed even through the line voltage Vin is the same. Then, an error occurs in the dimming angle calculation.

In further detail, the capacitor C1 generates the voltage VN1 by filtering a voltage divided from the line voltage Vin by the resistor 1 and the resistor R2. Accordingly, the voltage VN1 can be smoothed. In this case, when the line voltage Vin is high, a period during which the voltage VN1 is higher than the reference voltage may be wider than a period corresponding to the substantial dimming angle.

The dimming angle sensing circuit according to the first exemplary embodiment of the present invention clamps the line voltage Vin to a zener voltage using a zener diode.

In further detail, the dimming angle sensing circuit maintains a sense voltage VSE with a zener voltage VZENER 1 when the line voltage Vin is higher than the zener voltage, and generates a sense voltage VSE according to the line voltage Vin when the line voltage Vin is lower than the zener voltage VZENER 1.

Then, the sense voltage VSE that indicates a dimming angle can be generated without regard to the voltage range of the line voltage Vin so that occurrence of an error according to the voltage range of the line voltage Vin can be prevented.

Hereinafter, a dimming angle sensing circuit according to the first exemplary embodiment of the present invention will be described with reference to FIG. 2 and FIG. 3.

Figure 2:
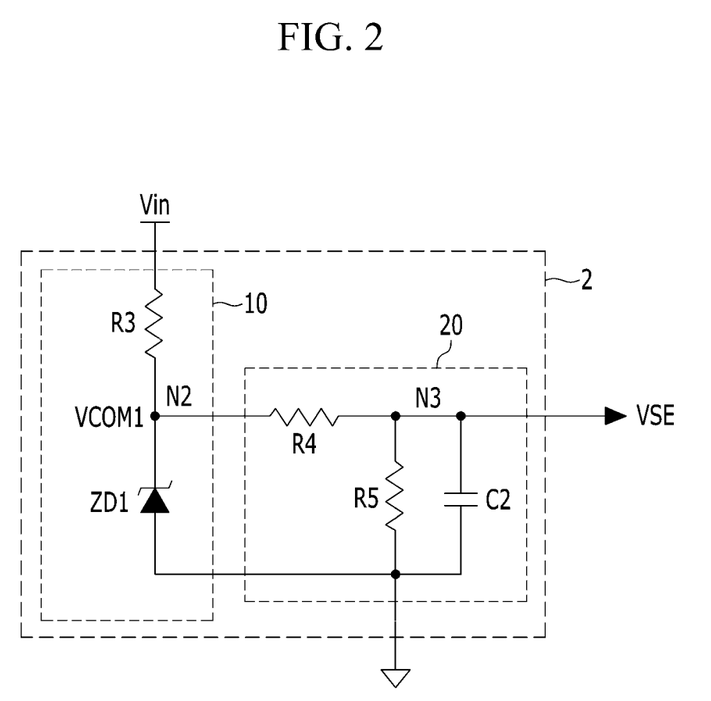
FIG. 2 shows a dimming angle sensing circuit according to a first exemplary embodiment of the present invention.

FIG. 2 shows a dimming angle sensing circuit according to the first exemplary embodiment of the present invention.

A dimming angle sensing circuit 2 includes a comparing circuit 10 and filtering circuit 20.

The comparing circuit 10 receives a line voltage Vin, and outputs a comparison result of the line voltage Vin and a zener voltage VZENER1. The comparing circuit 10 includes a resistor R3 and a zener diode ZD1.

A first end of the resistor R3 is connected to the line voltage Vin and a second end of the resistor R3 is connected to a cathode of the zener diode ZD1. An anode of the zener diode ZD1 is grounded.

When the line voltage Vin is higher than the zener voltage VZENER1 of the zener diode ZD1, the zener diode ZD1 is connected and a voltage of a node N2 becomes the zener voltage VZENER1. When the line voltage Vin is lower than the zener voltage VZENER1, the voltage of the node N2 is the line voltage Vin. Hereinafter, the voltage of the node N2 is referred to as a comparison voltage VCOM1.

As described, the comparing circuit 10 generates the comparison voltage VCOM1 according to a comparison result of the line voltage Vin and the zener voltage VZENER1.

The filtering circuit 20 generates a sense voltage VSE by filtering the comparison voltage VCOM1. The filtering circuit 20 includes two resistors R4 and R5 and a capacitor C2.

A first end of the resistor R4 is connected to the node N2 and a second end of the resistor R4 is connected to a node N3. A first end of the resistor R5 is connected to the node N3 and a second end of the resistor R5 is grounded. A first end of the capacitor C2 is connected to the node N3 and a second end of the capacitor C2 is grounded.

As a low pass filter, the filtering circuit 20 generates the sense voltage VSE by filtering a high frequency component of the comparison voltage VCOM1.

Figure 3:
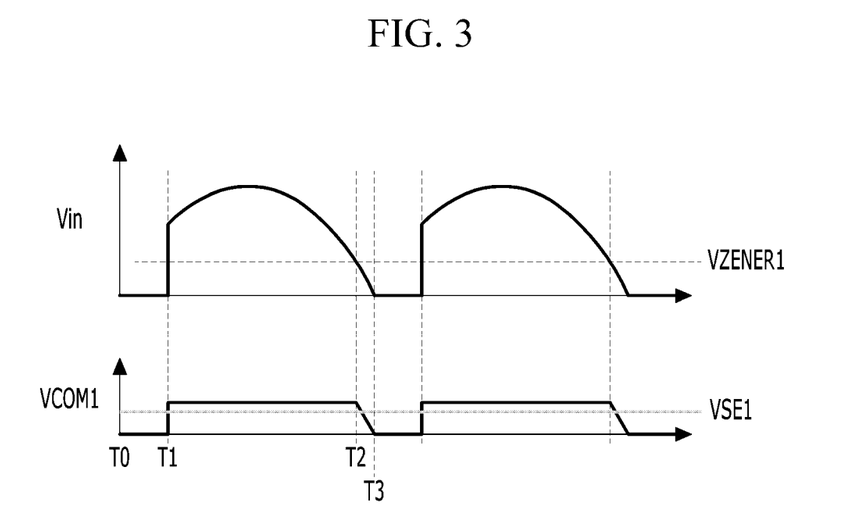
FIG. 3 shows a comparison voltage and a sense voltage according to a line voltage input to the dimming angle sensing circuit according to the first exemplary embodiment of the present invention.

FIG. 3 shows a comparison voltage and a sense voltage according to the line voltage input to the dimming angle sensing circuit according to the first exemplary embodiment of the present invention.

As shown in FIG. 3, a period T1 to T3 among one cycle period T0 to T3 of the line voltage Vin corresponds to a dimming angle. Thus, the line voltage Vin is not generated during a period T0 to T1.

During the period T0 to T1, the line voltage Vin is lower than the zener voltage VZENER1, and therefore the comparison voltage VCOM1 is equivalent to the line voltage Vin.

The line voltage Vin is higher than the zener voltage VZENER1 at a time point T1, and the line voltage Vin maintains to be higher than the zener voltage VZENER1 until a time point T2. Thus, during a period T1 to T2, the comparison voltage VCOM1 is maintained as the zener voltage VZENER1.

At the time point T2, when the line voltage Vin is lower than the zener voltage VZENER1, the comparison voltage VCOM1 is equivalent to the line voltage Vin.

As described, during one cycle of the line voltage Vin, the comparison voltage VCOM1 is generated according to the dimming angle of the line voltage Vin.

The comparison voltage VCOM1 is output as a sense voltage VSE through the filtering circuit 20, and as shown in FIG. 3, the sense voltage VSE has a level VSE1 according to the dimming angle.

Figure 4:
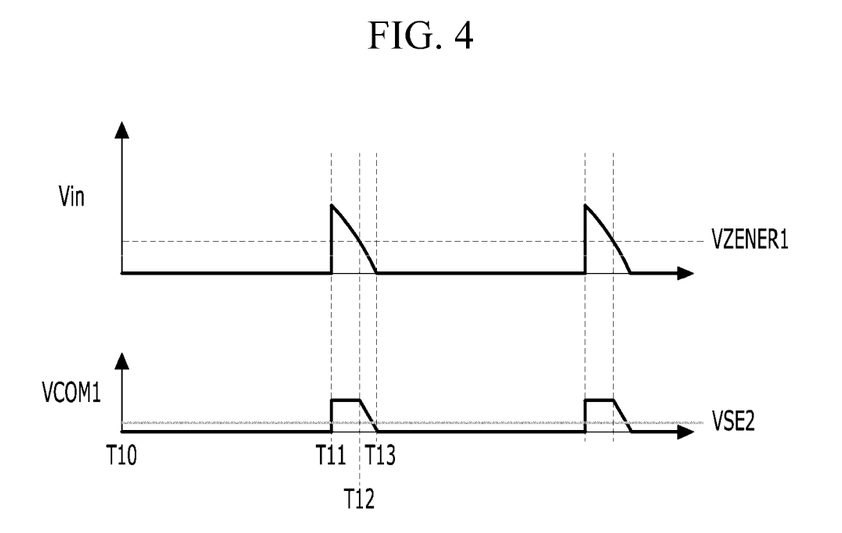
FIG. 4 shows a comparison voltage and a sense voltage according to a line voltage having a dimming angle that is smaller than that of the line voltage of FIG. 3.

FIG. 4 shows a comparison voltage and a sense voltage according to a line voltage having a dimming angle that is smaller than that of the line voltage of FIG. 3.

As shown in FIG. 4, a period T11 to T13 among a period T10 to T13, which is one cycle of the line voltage Vin corresponds to a dimming angle. Thus, the line voltage Vin is not generated during a period T10 to T11.

Since the line voltage Vin is lower than the zener voltage VZENER 1 during the period T10 to T11, the comparison voltage VCOM1 is equivalent to the line voltage Vin.

The line voltage Vin is higher than the zener voltage VZENER 1 at a time point T11, and the line voltage Vin is higher than the zener voltage VZENER1 until a time point T12. Thus, during a period T11 to T12, the comparison voltage VCOM1 is maintained as the zener voltage VZENER1.

When the line voltage is lower than the zener voltage VZENER1 at the time point T12, the comparison voltage VCOM1 is equivalent to the line voltage Vin.

As described, the comparison voltage VCOM1 is generated according to the dimming angle of the line voltage Vin during one cycle of the line voltage Vin.

The comparison voltage VCOM1 is output as a sense voltage VSE through the filtering circuit 20, and as shown in FIG. 4, the sense voltage VSE has a level VSE2 according to the dimming angle.

As shown in FIG. 3 and FIG. 4, the sense voltage VSE1 generated by the line voltage (the line voltage of FIG. 3) having a relatively large dimming angle is higher than the sense voltage VSE2.

As described, the level of the sense voltage VSE depends on the dimming angle. Dimming angle information can be provided through the sense voltage VSE. For example, the sense voltage VSE is transmitted to a control circuit of the power supply, and the control circuit can control an output current according to the sense voltage VSE.

Hereinafter, a dimming angle sensing circuit according to a second exemplary embodiment of the present invention will be described with reference to FIG. 5 to FIG. 7.

A dimming angle sensing circuit according to the second exemplary embodiment of the present invention clamps an auxiliary voltage VAUX to a zener voltage using a zener diode.

Figure 5:
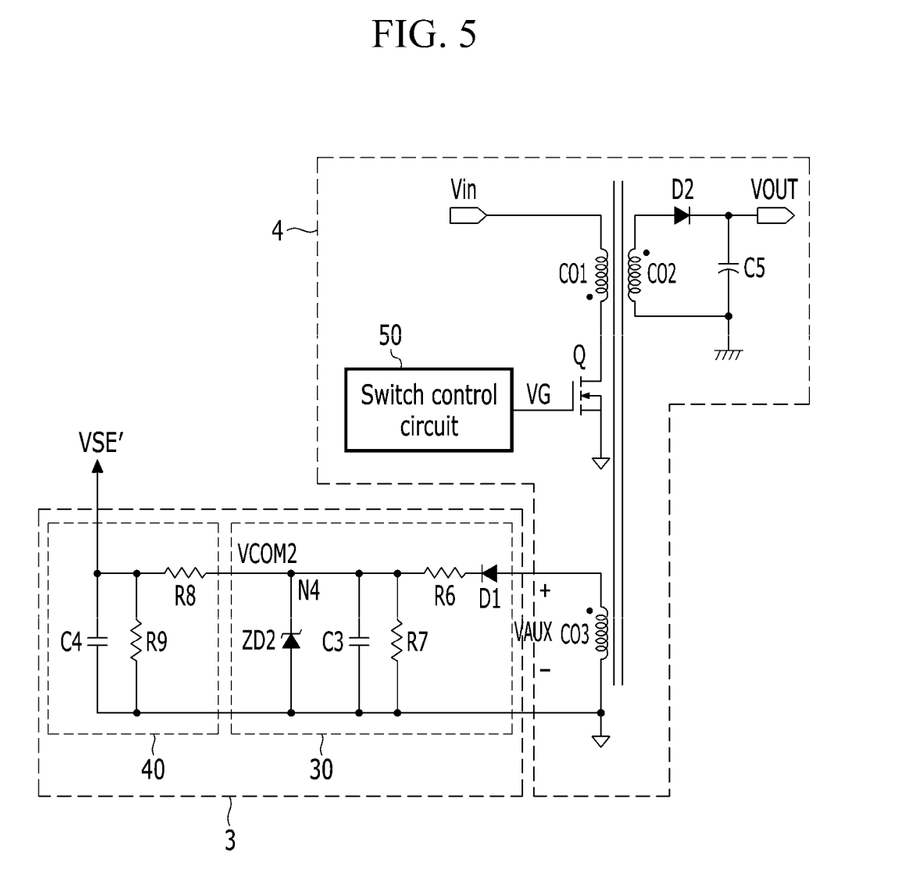
FIG. 5 shows a dimming angle sensing circuit according to a second exemplary embodiment of the present invention.

FIG. 5 shows a dimming angle sensing circuit according to the second exemplary embodiment of the present invention. The dimming angle sensing circuit according to the second exemplary embodiment of the present invention uses a voltage (hereinafter, an auxiliary voltage) of an auxiliary coil of an SMPS 4 rather than using a line voltage.

The SMPS 4 includes a first coil CO1, a second coil CO2, an auxiliary coil CO3, a rectification diode D2, an output capacitor C5, a switch Q, and a switch control circuit 50.

The switch control circuit 50 generates a gate voltage that controls switching operation of the switch Q according to an output voltage VOUT.

A first end of the first coil CO1 provided in the primary side is connected to a line voltage Vin and a second end of the first coil CO1 is connected to the switch Q.

A first end of the second coil CO2 provided in a secondary side that is insulated from the primary side is connected to an anode of the rectification diode D2 and a second end of the second coil CO2 is grounded.

A cathode of the rectification diode D2 is connected to a first end of the output capacitor C5 and a second end of the capacitor C5 is grounded.

The auxiliary coil CO3 is coupled to the first coil CO1 with a predetermined turn ratio.

Energy is stored in the first coil CO1 by the input voltage Vin during a turn-on period of the SMPS 4, and an auxiliary voltage VAUX is generated by the energy stored in the first coil CO1 during a turn-off period of the switch Q. Thus, no energy is stored in the first coil CO1 and thus no auxiliary voltage is generated while no line voltage Vin is provided.

In addition, the energy stored in the first coil CO1 is transmitted to the secondary side through the second coil CO2 during the turn-off period of the switch Q. During the turn-off period of the switch Q, a current flowing to the rectification diode D2 from the second coil CO2 is generated, and the current passed through the rectification diode D2 is supplied to a load connected to the output end thereof.

The output capacitor C5 is charged by the current passed through the rectification diode D2, and a voltage charged in the charging capacitor C5 is an output voltage VOUT.

During the turn-on period of the switch Q while the line voltage Vin is provided, the auxiliary voltage VAUX has a polarity that is opposite to the polarity of the line voltage Vin. During the turn-off period of the switch Q while the line voltage Vin is provided, the auxiliary voltage VAUX has a polarity that is the same as that of an output voltage VOUT.

Thus, while the line voltage Vin is provided, that is, during a period corresponding to the dimming angle, the auxiliary voltage VAUX alternately has a voltage according to the line voltage Vin and a voltage according to the output voltage VOUT.

A dimming angle sensing circuit 3 according to the second exemplary embodiment of the present invention uses that the auxiliary voltage VAUX is generated only during the line voltage Vin is provided.

The dimming angle sensing circuit 3 includes a comparing circuit 30 and a filtering circuit 40.

The comparing circuit 30 generates a comparison voltage VCOM2 according to a comparison result of a voltage corresponding to the auxiliary voltage VAUX and a zener voltage VZENER2. The comparing circuit 30 includes two resistors R6 and R7, a capacitor C3, and a zener diode ZD2.

An anode of the diode D1 is connected to the auxiliary voltage VAUX. A cathode of the diode D1 is connected to a first end of the resistor R6, a second end of the resistor R6 is connected to a first end of the resistor R7, a first end of the capacitor C3, and a cathode of the zener diode ZD2.

When the resistor R6 is not provided, a cathode voltage of the zener diode ZD2 can be determined as the auxiliary voltage VAUX. A voltage difference is generated between the cathode of the zener diode ZD2 and the auxiliary voltage VAUX by the resistor R6 so that the zener diode ZD2 may be biased.

A second end of the resistor R7, a second end of the capacitor C3, and an anode of the zener diode ZD2 is grounded. The resistor R7 forms a discharge path of the capacitor C3 while no line voltage Vin is provided.

Since no auxiliary voltage VAUX is generated when no line voltage Vin is provided, the diode D1 is disconnected. During the turn-on period of the switch Q while the line voltage Vin is provided, the auxiliary voltage VAUX is a negative voltage and thus the diode D1 is disconnected.

While the diode D1 is disconnected, a voltage of the capacitor C3 is discharged by the resistor R7. Thus, a voltage of a node N4, that is a comparison signal VCOM2 becomes zero voltage due to discharging of the capacitor C3.

During the turn-off period of the switch Q while the line voltage Vin is provided, the auxiliary voltage VAUX has a positive voltage according to the output voltage VOUT so that the diode D1 is connected.

In this case, a voltage transmitted through the diode D1 is maintained as a DC voltage by the capacitor C3 and thus compared with the zener voltage VZENER2. The zener diode ZD2 is connected when the voltage held in the capacitor C3 is higher than the zener voltage VZENER2, and the comparison signal VCOM2 is the zener voltage VZENER2.

The filtering circuit 40 is the same as the filtering circuit 20 in configuration and function, and generates a sense voltage VSE' by low pass filtering a comparison signal VCOM2.

The filtering circuit 40 includes a resistor R8, a resistor R9, and a capacitor C4. A first end of the resistor R8 is connected to the comparison signal VCOM2, and a second end of the resistor R8 is connected to a first end of the resistor R9 and a first end of the capacitor C4. A second end of the resistor R9 and a second end of the capacitor C4 are grounded.

The sense voltage VSE' may be input to the switch control circuit 50, and the switch control circuit 50 may consider the sense voltage VSE' in duty control of the switch Q.

Figure 6:
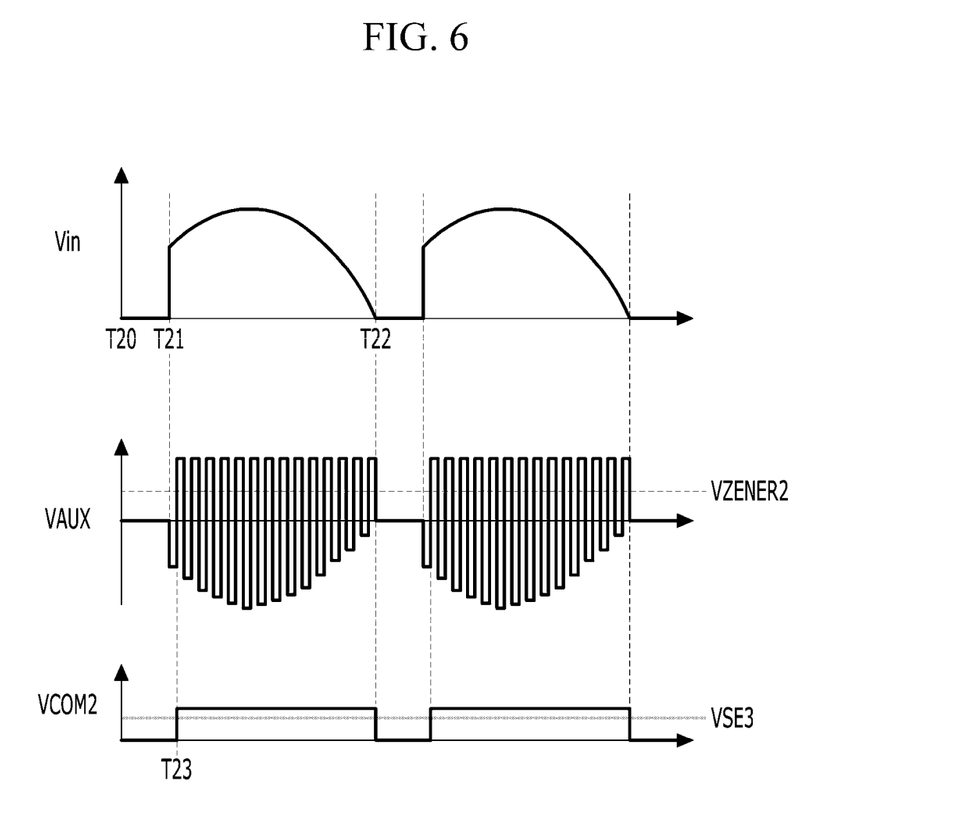
FIG. 6 shows an auxiliary voltage, a comparison voltage, and a sense voltage according to a line voltage input to the dimming angle sensing circuit according to the second exemplary embodiment of the present invention.

FIG. 6 shows an auxiliary voltage, a comparison voltage, and a sense voltage according to a line voltage input to the dimming angle sensing circuit according to the second exemplary embodiment of the present invention.

As shown in FIG. 6, a period T21 to T22 among a period T20 to T22, which is one cycle period of a line voltage Vin corresponds to a dimming angle. Thus, the line voltage Vin is not generated during the period T20 to T22.

Since no auxiliary voltage VAUX is generated during the period T20 to T21, a comparison voltage VCOM2 is zero voltage.

When the line voltage Vin is generated at a time point T21, the auxiliary voltage VAUX is generated. When the switch Q is turned off at a time point T23, the auxiliary voltage VAUX is higher than the zener voltage VZENER2, and therefore the comparison voltage VCOM2 is generated as the zener voltage VZENER2. Although the time point T21 and the time point T23 are individually marked in FIG. 6, the period is shorter than one switching cycle of the switch Q, and therefore a time difference between the two time points may be ignored.

Since the auxiliary voltage VAUX is generated during a period T21 to T22, the comparison voltage VCOM2 is maintained as the zener voltage VZENER2.

When no line voltage Vin is provided after the time point T22, the comparison voltage VCOM2 becomes zero voltage.

As described, the comparison voltage VCOM2 is generated according to the line voltage Vin during one cycle of the line voltage Vin.

The comparison voltage VCOM2 is output as the sense voltage VSE' through the filtering circuit 40, and as shown in FIG. 6, the sense voltage VSE' has a level VSE3 that depends on the dimming angle.

Figure 7:
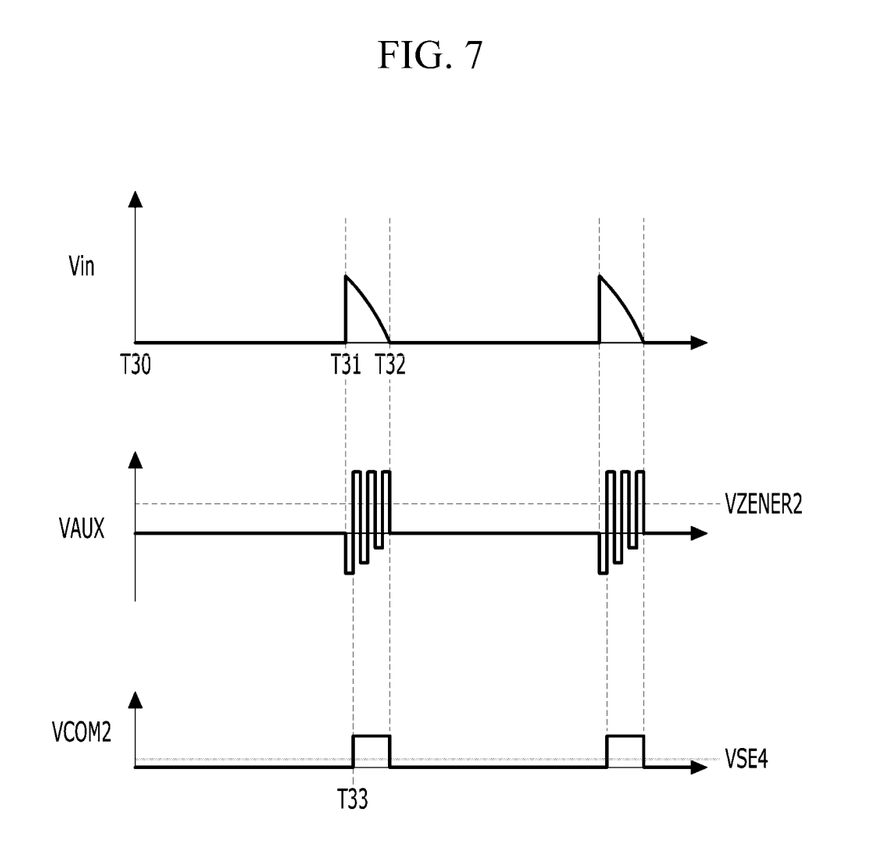
FIG. 7 shows an auxiliary voltage, a comparison voltage, and a sense voltage according to a line voltage having a dimming angle that is smaller than that of the line voltage of FIG. 6.

FIG. 7 shows an auxiliary voltage, a comparison voltage, and a sense voltage according to a line voltage having a dimming angle that is smaller than that of the line voltage of FIG. 6.

As shown in FIG. 7, a period T31 to T32 among a period T30 to T32, which is one cycle period of a line voltage Vin corresponds to a dimming angle. Thus, no line voltage Vin is generated during the period T30 to T31.

Since no auxiliary voltage VAUX is generated during the period T30 to T31, the comparison voltage VCOM2 is zero voltage.

When the line voltage Vin is generated at a time point T31, the auxiliary voltage VAUX is generated. Since the auxiliary voltage VAUX is higher than the zener voltage VZENER2 at a time point T33, the comparison voltage VCOM2 is generated as the zener voltage VZENER2. Although the time point T31 and the time point T33 are individually marked in FIG. 7, a time difference between the two time points may be ignored.

Since the auxiliary voltage VAUX is generated during a period T31 to T32, the comparison voltage VCOM2 is maintained as the zener voltage VZENER2.

During a period that no line voltage Vin is provided after a time point T32, the comparison voltage VCOM2 becomes zero voltage.

As described, the comparison voltage VCOM2 is generated according to the dimming angle during one cycle of the line voltage Vin.

The comparison voltage VCOM2 is output as the sense voltage VSE' through the filtering circuit 40, and as shown in FIG. 7, the sense voltage VSE' has a level VSE4 that depends on the dimming angle.

As shown in FIG. 6 and FIG. 7, the sense voltage VSE3 generated by a line voltage (e.g., the line voltage of FIG. 6) having a relatively large dimming angle is higher than the sense voltage VSE4.

As described, the level of the sense voltage VSE' depends on the dimming angle. Information on the dimming angle can be provided through the sense voltage VSE'.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS dimming angle sensing circuit 1, 2, and 3
Resistor R1, R2, R3, R4, R5, R6, R7, R8, R9
capacitor C1, C2, C3, C4
zener diode ZD1 and ZD2
SMPS 4, first coil CO1, second coil CO2, auxiliary coil CO3
output capacitor C5, switch Q, switch control circuit 50
comparing circuit 10 and 30 and filtering circuit 20 and 40
diode D1, rectification diode D2

What is claimed is:

1. A dimming angle sensing circuit comprising:
a comparing circuit generating a comparison voltage according to a comparison result of a line voltage and a zener voltage, the line voltage generated by rectifying an AC input passed through a dimmer; and
a filtering circuit generating a sense voltage corresponding to a dimming angle of the dimmer by low-pass filtering the comparison voltage.

2. The dimming angle sensing circuit of claim 1, wherein the comparison circuit receives the line voltage through a first resistor and comprises a zener diode being connected when the line voltage is higher than the zener voltage, and the comparison voltage is a voltage of a first node where the first resistor and the zener diode are connected.

3. The dimming angle sensing circuit of claim 2, wherein the first resistor is connected to the line voltage and a cathode of the zener diode, and an anode of the zener diode is connected to the ground.

4. The dimming angle sensing circuit of claim 1, wherein the filtering circuit comprises:
a second resistor and a third resistor that divide the comparison voltage; and
a capacitor connected to a second node where the second resistor and the third resistor are connected, and
the sense voltage is a voltage of the second node.

5. The dimming angle sensing circuit of claim 4, wherein a first end of the second resistor is connected to the comparison voltage, the third resistor is connected between a second end of the second resistor and the ground, and the capacitor is connected to the third resistor in parallel.

6. A dimming angle sensing circuit receiving an auxiliary voltage generated from an auxiliary coil from a power supply including the auxiliary coil coupled with a predetermined turn ratio to a first coil that is connected to a line voltage rectified from an AC passed through a dimmer, comprising:
a comparing circuit generating a comparison voltage according to a comparison result of a first voltage that depends on the auxiliary voltage with a zener voltage; and
a filtering circuit generating a sense voltage that corresponds to a dimming angle of the dimmer by low-pass filtering the comparison voltage.

7. The dimming angle sensing circuit of claim 6, wherein the auxiliary voltage is generated only while the line voltage is provided.

8. The dimming angle sensing circuit of claim 7, wherein, while the line voltage is provided, the auxiliary voltage has a polarity that is opposite to that of the line voltage during a turn-on period of the switch and the auxiliary voltage has a polarity that is the same as that of an output voltage of the power supply during a turn-off period of the switch.

9. The dimming angle sensing circuit of claim 6, wherein the comparing circuit comprises:
a diode connected by the auxiliary voltage;
a capacitor maintaining a voltage transmitted through the diode as a DC voltage; and
a zener diode being connected when the DC voltage maintained by the capacitor is higher than a zener voltage, and the comparison voltage is a cathode voltage of the zener diode.

10. The dimming angle sensing circuit of claim 9, wherein the comparing circuit further comprises a fourth resistor biasing the zener diode by generating a voltage difference between a cathode of the zener diode and the auxiliary voltage, and the first voltage is obtained by subtracting a both-end voltage of the fourth resistor from the auxiliary voltage.

11. The dimming angle sensing circuit of claim 9, wherein the comparing circuit further comprises a fifth resistor connected to the capacitor in parallel and forming a discharging path of the capacitor during a period that no line voltage is provided.

12. The dimming angle sensing circuit of claim 6, wherein the filtering circuit comprises:
a second resistor and a third resistor that divide the comparison voltage; and
a capacitor connected to a second node where the second resistor and the third resistor are connected, and
the sense voltage is a voltage of the second node.

13. The dimming angle sensing circuit of claim 12, wherein a first end of the second resistor is connected to the comparison voltage, the third resistor is connected between a second end of the second resistor and the ground, and the capacitor is connected to the third resistor in parallel.

14. The dimming angle sensing circuit of claim 6, wherein the comparing circuit comprises:
   a diode including an anode to which the auxiliary voltage is connected;
   a fourth resistor having a first end connected to a cathode of the diode;
   a fifth resistor connected between a second end of the fourth resistor and the ground;
   a capacitor connected to the fifth resistor in parallel; and
   a zener diode connected to the capacitor in parallel.

15. The dimming angle sensing circuit of claim 14, wherein the first voltage is a voltage passed through the diode and the fourth resistor.

16. A method for driving a dimming angle sensing circuit including a zener diode, comprising:
   receiving a line voltage generated from rectification of an AC input passed through a dimmer;
   maintaining a comparison voltage as a zener voltage when the line voltage is higher than the zener diode; and
   generating a sense voltage corresponding to a dimming angle of the dimmer by low-pass filtering the comparison voltage.

17. The method for driving a dimming angle sensing circuit of claim 16, wherein when the line voltage is lower than the zener voltage, the comparison voltage depends on the line voltage.

18. A method for driving a dimming angle sensing circuit including a zener diode, comprising:
   receiving an auxiliary voltage of an auxiliary coil coupled to a first coil with a predetermined turn ratio, the first coil connected to a line voltage that is rectified from an AC input passed through a dimmer;
   generating a comparison voltage according to a comparison result of a first voltage corresponding to the auxiliary voltage and a zener voltage; and
   generating a sense voltage corresponding to a dimming angle of the dimmer by low-pass filtering the comparison voltage.

19. The method for driving the dimming angle sensing circuit of claim 18, wherein the auxiliary voltage is generated during the line voltage is provided, and
   while the line voltage is provided, the method for driving the dimming angle sensing circuit further comprises:
   generating the auxiliary voltage with a polarity that is opposite to a polarity of the line voltage during a turn-on period of a switch connected to the first coil; and
   generating the auxiliary voltage with a polarity that is the same as that of an output voltage of the power supply during a turn-off period of the switch.

20. The method for driving the dimming angle sensing circuit of claim 18, wherein the generating the comparison voltage comprises:
   connecting a diode by the auxiliary voltage;
   maintaining a voltage transmitted through the diode as a DC voltage by a capacitor; and
   connecting the zener diode when the DC voltage is higher than the zener voltage, and
   the comparison voltage is a cathode voltage of the zener diode.

\* \* \* \* \*